US011023257B2

(12) United States Patent
Bullard et al.

(10) Patent No.: US 11,023,257 B2
(45) Date of Patent: *Jun. 1, 2021

(54) LOADER APPLICATION WITH SECONDARY EMBEDDED APPLICATION OBJECT

(71) Applicant: Citrix Systems, Inc., Fort Lauderdale, FL (US)

(72) Inventors: Justin Bullard, Wilton Manors, FL (US); Michael Pitts, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,273

(22) Filed: Mar. 11, 2020

(65) Prior Publication Data

US 2020/0210209 A1    Jul. 2, 2020

Related U.S. Application Data

(63) Continuation of application No. 15/724,764, filed on Oct. 4, 2017, now Pat. No. 10,628,175.

(51) Int. Cl.
*G06F 9/445* (2018.01)
*G06F 8/60* (2018.01)

(52) U.S. Cl.
CPC .......... *G06F 9/44505* (2013.01); *G06F 8/60* (2013.01); *G06F 9/445* (2013.01)

(58) Field of Classification Search
CPC . G06F 16/254; G06F 8/30; G06F 9/54; G06F 9/44505; G06F 8/60; G06F 9/445
See application file for complete search history.

(56) References Cited

U.S. PATENT DOCUMENTS 7,747,588 B2   6/2010   Thompson et al.
8,387,020 B1   2/2013   MacLachlan et al.
(Continued)

OTHER PUBLICATIONS

Apple; iOS App Programming Guide; Apple Inc.; 153 pages; retrieved on Jul. 16, 2020 (Year: 2013).*

(Continued)

*Primary Examiner* — S. Sough
*Assistant Examiner* — Cuong V Luu
(74) *Attorney, Agent, or Firm* — Banner & Witcoff, Ltd.

(57) ABSTRACT

Methods, systems, and non-transitory computer-readable media for embedding a secondary application object within a loader application are described herein. In some embodiments, a computing platform may initiate a first iOS application comprising a first name and a first instance of UIApplication comprising an NSObject class. Further, the computing platform may embed into the first iOS application, a second iOS application comprising a second name, a second instance of UIApplication, and a first derived class. Next, the computing platform may generate, based on NSObject and the first derived class, a second derived class. Additionally, the computing platform may generate an iPhone Application (IPA) file comprising the first iOS application wherein the first iOS application comprises the second derived class and the second name. Subsequently, the computing platform may distribute via a communication interface, the IPA file.

20 Claims, 8 Drawing Sheets

(56) References Cited

U.S. PATENT DOCUMENTS

| | | |
|---|---|---|
| 8,918,772 B1 | 12/2014 | MacLachlan et al. |
| 8,919,772 B2 | 12/2014 | Okumura |
| 9,383,983 B2 | 7/2016 | Hung et al. |
| 9,910,721 B2 | 3/2018 | Wu et al. |
| 10,042,735 B2 | 8/2018 | Nandakumar et al. |
| 2007/0061345 A1 | 3/2007 | Thompson et al. |
| 2014/0059703 A1 | 2/2014 | Hung et al. |
| 2014/0109078 A1 | 4/2014 | Lang et al. |
| 2016/0364276 A1 | 12/2016 | Wu et al. |
| 2017/0010952 A1 | 1/2017 | Nandakumar et al. |

OTHER PUBLICATIONS

Kuan-Nian Su et al.; Fast Host Service Interface Design for Embedded Java Application Processor; IEEE; pp. 1357-1360; retrieved on Jan. 29, 2021 (Year: 2009).*

Qiming Teng et al.; A HAL for Component-based Embedded Operating Systems; IEEE; 2 page; retrieved on Jan. 29, 2021 (Year: 2005).*

"UIApplication" from Stack OverFlow; Accessed Oct. 4, 2017; https://stackoverflow.com/tags/uiapplication/info.

"UIApplication Delegate," UIKit; Apple Developer Documentation; Accessed Oct. 4, 2017; https://developer.apple.com/documentation/uikit/uiapplicationdelegate#//apple_ref/occ/intf/UIApplicationDelegate.

"UIApplication Main," UIKit; Apple Developer Documentation; Accessed Oct. 4, 2017; <https://developer.apple.com/documentation/uikit/1622933-uiapplicationmain>.

"What is a Derived Class?" Definition from Techopedia; Accessed Oct. 4, 2017; https://www.techopedia.com/definition/3780/derived-class.

"How do I Inspect a Class in Objective-C?" from Stack Overflow; Accessed Oct. 4, 2017; https://stackoverflow.com/questions/1890480/how-do-i-inspect-a-class-in-objective-c.

"NSMutable Dictionary—Foundation," Apple Developer Documentation; Accessed Oct. 4, 2017; https://developer.apple.com/documentation/foundation/nsmutabledictionary.

"IPhone—How to Make an IPA File?" from Stack OverFlow; Accessed Oct. 4, 2017; https://stackoverflow.com/questions/4711586/how-to-make-an-ipa-file.

"IPA File—What Is It and How Do I Open It?" Accessed Oct. 4, 2017; https://file.org/extension/ipa.

Jul. 15, 2019—U.S. Non-Final Office Action—U.S. Appl. No. 15/724,764.

How to make an ipa file?; retrieved on Jul. 8, 2019; Stack Overflow, 6 pages (Year: 2011).

Dec. 18, 2019—U.S. Notice of Allowance—U.S. Appl. No. 15/724,764.

Garo Bournoutian et al.; On Device Objective C Application Optimization Framework for High-Performance Mobile Processors; EDAA; 6 pages; retrieved on Dec. 5, 2019 (Year:2014).

Arno Puder; Cross Compiling Android Appllications to the iPhone; ACM; pp. 69-77; retrieved on Dec. 5, 2019 (Year:2010).

* cited by examiner

LOADER APPLICATION WITH SECONDARY EMBEDDED APPLICATION OBJECT

CROSS REFERENCE TO RELATED APPLICATIONS

This application is a continuation application of U.S. application Ser. No. 15/724,764, filed Oct. 4, 2017, entitled "Loader Application with Secondary Embedded Application Object."

FIELD

Aspects described herein generally relate to computer hardware and software, including iOS application development. In particular, one or more aspects of the disclosure relate to computer hardware and software for embedding a secondary application object within a loader application.

BACKGROUND

Enterprise organizations and their employees are increasingly looking for ways to secure iOS applications. As iOS applications are more frequently adopted and used, it is increasingly important to secure these iOS applications in order to protect the safety and security of enterprise information and other enterprise resources. For example, enterprise organizations may secure iOS applications prior to execution through an app-wrapping process, which then catches hooks during runtime. However, while some hooks may be caught, others might not. In some instances, this may present technical challenges. There remains an ever-present need to improve methods for securing iOS applications.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a loader application with a secondary embedded application object. For example, this loader application may load an embedded application into memory and subsequently execute the application. The loader application may implement derived classes to allow the loader application to behave like the embedded application without causing technical challenges, such as application incompatibility or failed execution.

In accordance with one or more embodiments, a computing platform having at least one processor, memory, and a communication interface may initiate, by the at least one processor, a first iOS application comprising a first name and a first instance of UIApplication comprising an NSObject class. Subsequently, the computing platform may embed, by the at least one processor and into the first iOS application, a second iOS application comprising a second name, a second instance of UIApplication, and a first derived class. Thereafter, the computing platform may generate, by the at least one processor, based on NSObject and the first derived class, a second derived class. In addition, the computing platform may generate, by the at least one processor, an iPhone Application (IPA) file comprising the first iOS application wherein the first iOS application comprises the second derived class and the second name. Further, the computing platform may transmit, by the at least one processor, via the communication interface, and to a plurality of mobile devices, the IPA file.

In some instances, the computing platform may inspect by the at least one processor and via objectiveC inspection classes, the first derived class. Further, the first derived class may comprise at least one of: a variable of the second iOS application, a selector of the second iOS application, a method of the second iOS application, and a property of the second iOS application. Additionally, the computing platform may inspect the first derived class at runtime.

In some examples, the computing platform may load, by the at least one processor and within an address space of the first iOS application, the second iOS application. In some instances, the computing platform may load, prior to the embedding, the second iOS application.

In some embodiments, the computing platform may configure by the at least one processor, the second derived class as a forwarding object for unknown selectors.

In some instances, the first iOS application may comprise a loader application and the second iOS application may comprise a third party application.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards embedding a secondary application object within a loader application in an operating system such as iOS. A computing platform may determine an NSObject class for the loader application, and a first derived class for the secondary application object. The loader application may comprise a first instance of UIApplication, and the secondary application object may comprise a second instance of UIApplication. The computing platform may determine, for the loader application and based on the NSObject class and the first derived class, a second derived class comprising the methods of both the first instance of UIApplication and the second instance of UIApplication. The computer platform may generate an iPhone Application (IPA) file based on the second class, and distribute the IPA file to a user device. This may allow the loader application to perform the functions of the secondary application object, on a user device, without calling a second instance of UIApplication.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
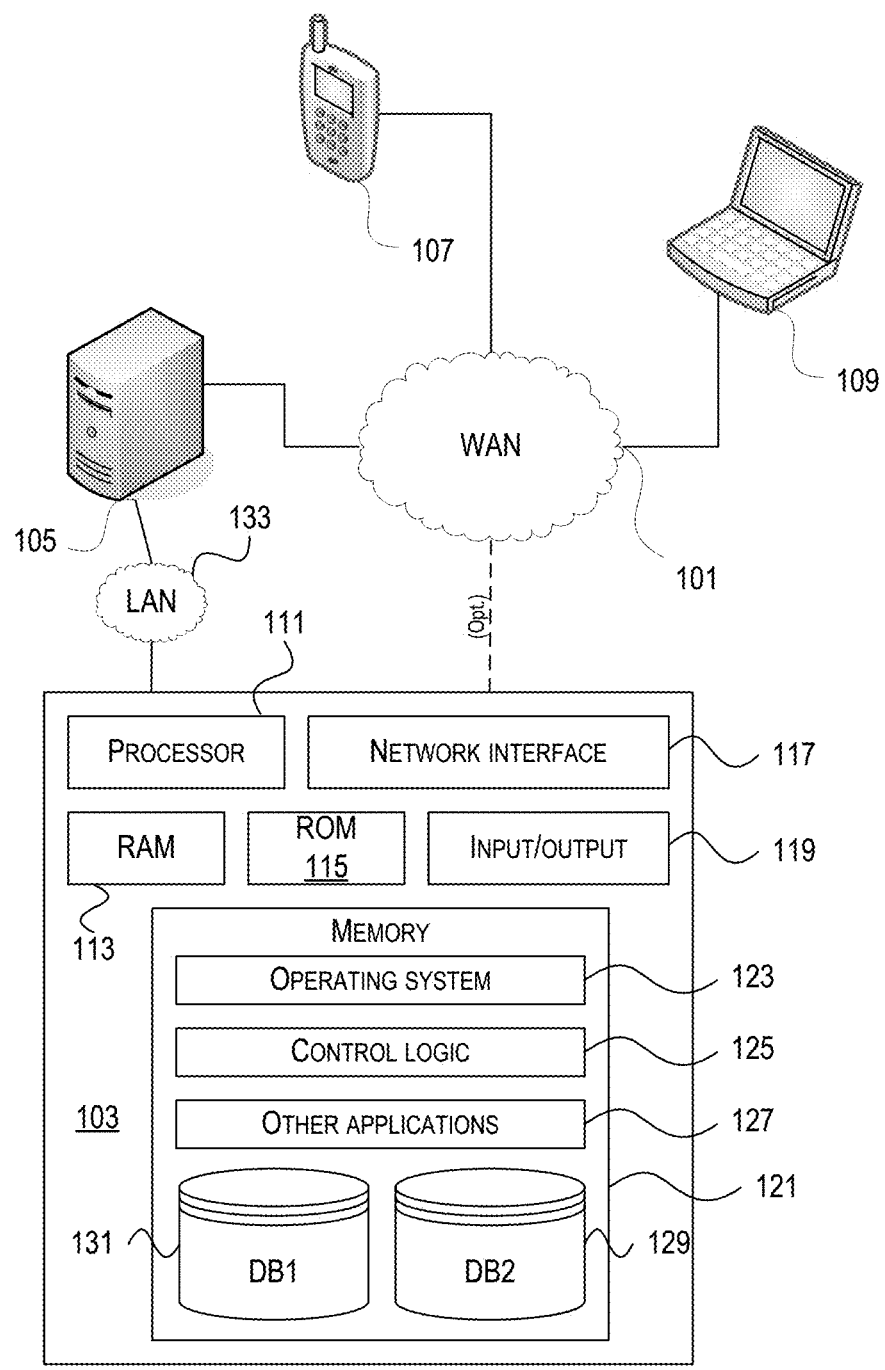
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Loader Application with Secondary Embedded Application Object Methods

As discussed above, aspects of the disclosure relate to using a loader application to embed a secondary application. In addition, one or more aspects of the disclosure may incorporate, be embodied in, and/or be implemented using on or more of the computer system architecture, and/or enterprise mobility management systems described in FIGS. 1, 5, and 6.

Figure 2:
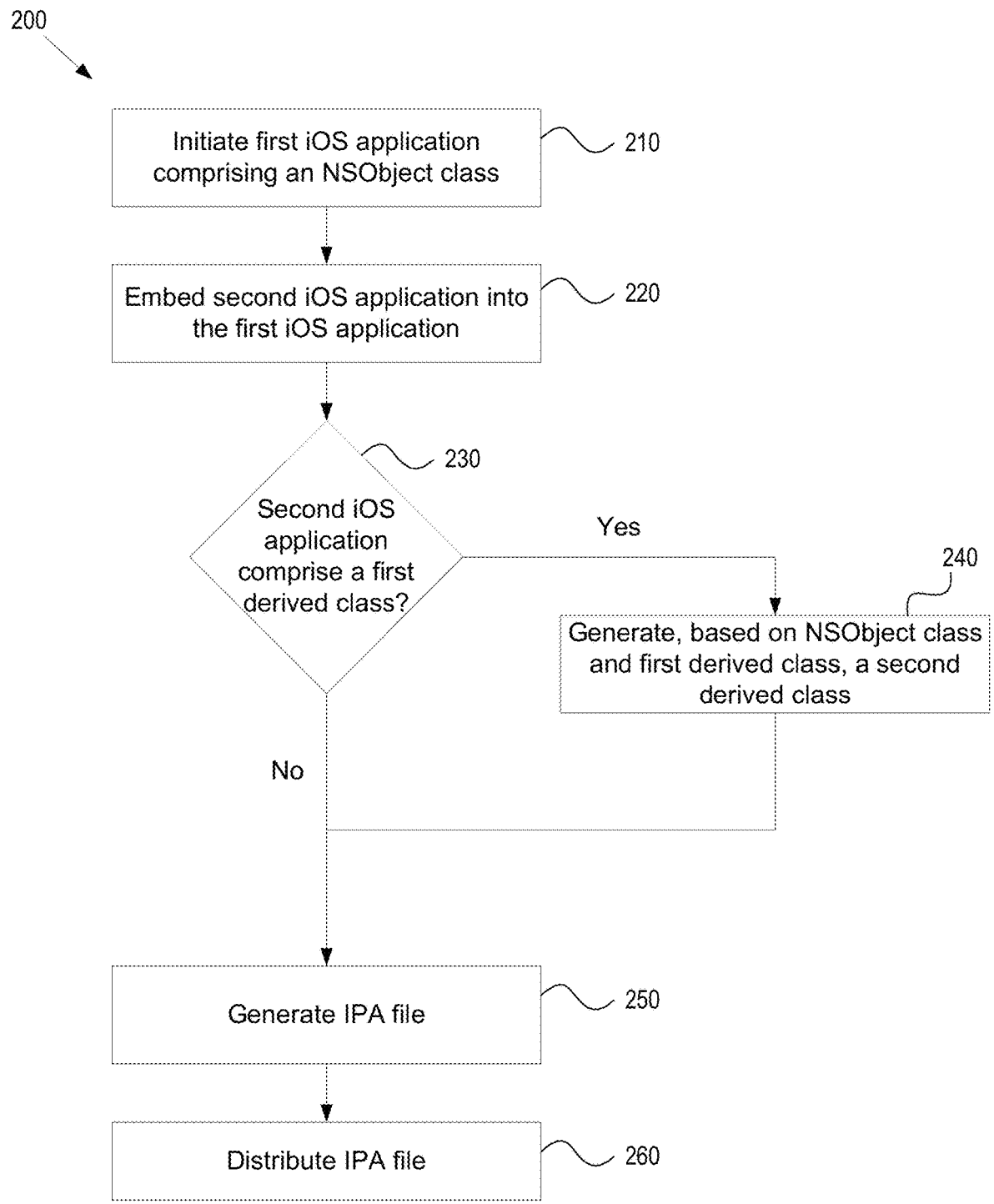
FIG. 2 depicts an example method for using a first application to embed a second application in accordance with one or more illustrative aspects described herein.

FIG. 2 depicts an example method 200 for using a first application to embed a second application in accordance with one or more illustrative aspects described herein. Referring to FIG. 2, at step 210, a computing platform having at least one processor, a communication interface, and a memory may initialize a first iPhone operating system (iOS) application. The first iOS application may comprise, for example, a loader application. The loader application may comprise an NSObject class specifying a plurality of parameters. For example, the NSObject class may specify variables of the loader application, methods of the loader application, selectors of the loader application, and properties of the loader application. The loader application may comprise an iOS application that may be used to load a secure version of another iOS application. For example, the loader application may comprise a container for the second application.

The loader application may comprise a first instance of UIApplication. UIApplication may provide a central control point for iOS applications. Each iOS application may have a single instance of UIApplication. UIApplication may be used to handle initial routing of incoming events. UIApplication may further be used to manage device specific behavior such as control an application's response to changes in interface orientation, temporarily suspend incoming touch events, turn proximity sensing off and on, register for remote notifications, trigger an undo-redo user interface, determine whether an installed application can open a URL, extend execution of an application so that it can finish a task in the background, schedule and cancel local notifications, coordinate the reception of remote-control events, perform application level state restoration tasks, and the like.

The loader application may implement a main function comprising an entry point to the loader application. The main function may call ApplicationMain which may generate an interface for the loader application. ApplicationMain may prompt for two parameters: a user application class (such as UIApplication class, NIL, a derived class from UIApplication, and the like) and UIApplication delegate (an object that an iOS application may inform of significant runtime events such as application launch, low-memory warnings, and application termination). Additional tasks that UIApplication delegate may perform include: respond to temporary interruptions, respond to changes in an execution state of an application, respond to notifications from outside the application, determine whether state preservation/restoration should occur, respond to events that target an application, store applications central data objects, determine why the application was launched, determine whether state restoration should proceed, register for remote notifications supported by the application, open a URL sent to the application, provide a root window object for the application, and the like.

ApplicationMain may instantiate an application object from the user application class and UIApplication delegate. Additionally, ApplicationMain may determine a main event loop and may begin to process events. For example, ApplicationMain may determine a main event loop and may begin to process events for the loader application.

At step 220 the computing platform may embed, into the first iOS application, a second iOS application. For example, a third party may develop an iOS application, such as "Company Mail." The third party may wish to secure "Company Mail," and thus may embed "Company Mail" into the loader application. The computing platform may load, prior to embedding the second iOS application and within an address space of the first iOS application, the second iOS application. The second iOS application may have a different name than the first iOS application may comprise a second instance of UIApplication and an associated class. In one example, the second iOS application may comprise a first derived class comprising a custom plurality of parameters, selectors, methods, and properties. The first derived class may be different than the NSObject class. The first derived class may comprise a class derived from the NSObject class, and may be determined via inheritance. For example, the first derived class may modify the parameters, selectors, methods, and properties of the NSObject class. This modification may be based on the purpose of the second iOS application. In another example, the second iOS application may comprise the NSObject class.

At step 230, the computing platform may determine whether the second iOS application, embedded by the computing platform in step 220, comprises a derived class different than the NSObject class of the first iOS application, initiated in step 210. The computing platform may compare the parameters, selectors, methods, and properties of the class associated with the second instance of UIApplication to the parameters, selectors, methods, and properties of the NSObject class of the first instance of UIApplication. The computing platform may compare the classes by inspecting, at runtime and via objectiveC inspection classes, the class associated with the second instance of UIApplication. For example, the computing platform may implement an NSMutableDictionary which may key on names of the parameters, selectors, methods and properties associated with each of the first instance of UIApplication and the second instance of UIApplication. NSMutableDictionary may comprise a dynamic collection of key-value pairs associated with the parameters, selectors, methods, and properties of each of the first instance of UIApplication and the second instance of UIApplication. If the second iOS application does not comprise a first derived class different than the NSObject class of the first iOS application, the computing platform may proceed to step 250. If the second iOS application does comprise a first derived class different than the NSObject class of the first iOS application, the computing platform may proceed to step 240.

At step 240, the computing platform may generate, based on the NSObject class and the first derived class, a second derived class. For example, the computing platform may determine, via inheritance, the second derived class. This may allow the first iOS application to implement functions of the second iOS application without calling the second instance of UIApplication. For example, this may allow the loader application to function as the "Company Mail" application by calling the first instance of UIApplication. The second derived class may comprise the parameters, selectors, methods, and properties of the NSObject class, as well as the parameters, selectors, methods, and properties of the first derived class. This may allow the second derived class to comprise logic from the first derived class, associated with the second instance of UIApplication, and logic from the NSObject class, associated with the first instance of UIApplication.

At step 250, the computing platform may generate an iPhone Application (IPA) file comprising the second iOS application embedded within the first iOS application. The IPA file may comprise the name of the second iOS application. For example, the IPA file may be named "Company Mail."

To generate the IPA file, the computing platform may perform the following steps. First, the computing platform may build the application. If the build is successful, the computing platform may receive an input requesting that the computing platform navigate to the "Products" folder in project navigator. The computing platform may receive a right click input, and may display an option "Show in Finder." Responsive to receiving an input corresponding to the "Show in Finder" option, the computing platform may copy the application file. The computing platform may create a new folder at a new location, and paste the application file into the new folder. The computing platform may zip the new folder, and rename the new folder with .ipa. Although an exemplary method for generating an IPA file is described above, it should be understood that many other methods for generating an IPA file are known in the art and may be substituted. It should be understood that these other methods are not outside of the scope of the disclosure.

At step 260, the computing platform may distribute the IPA file generated at step 250. For example, the computing platform may upload, to a server associated with the iTunes application store, the IPA file. This may allow a user to download and subsequently execute the IPA file on one of the plurality of mobile devices, thus allowing him or her to access a secure version of the second iOS application via the first iOS application. For example, this may allow a third party to generate an application, secure the application, and distribute the secure application to a plurality of user devices.

Figure 3:
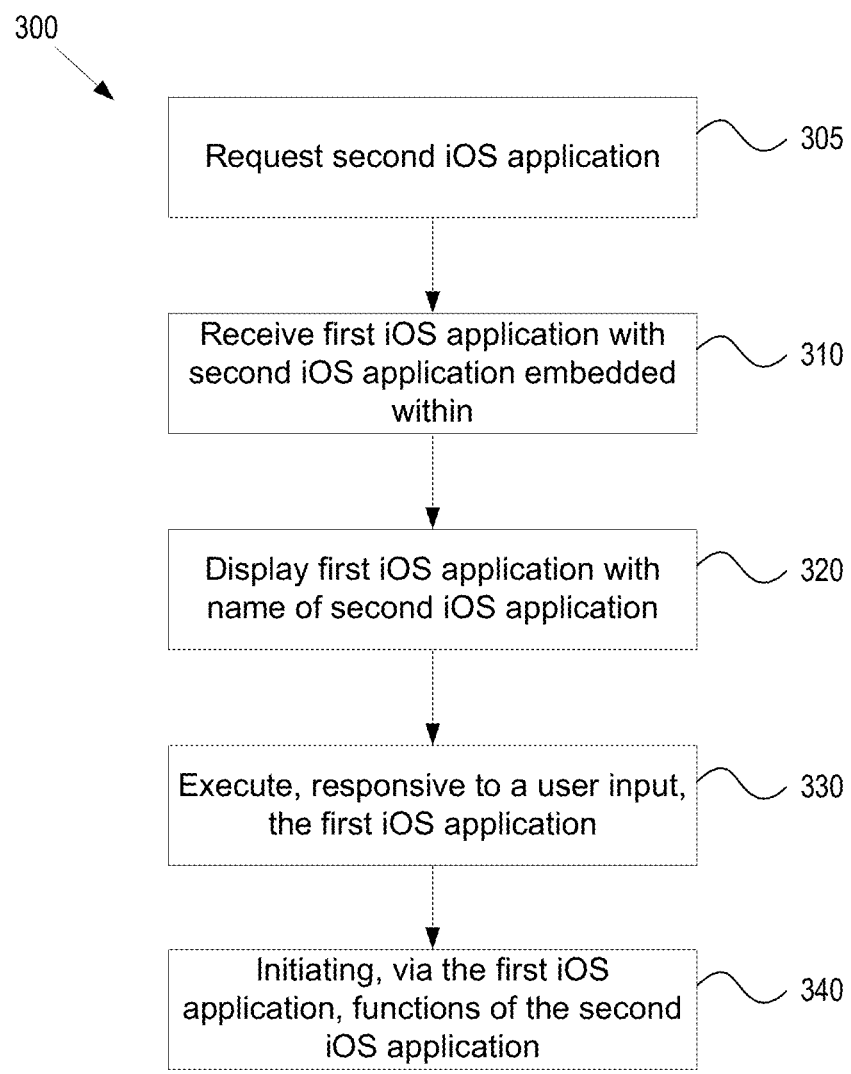
FIG. 3 depicts an example method 300 for processing, at a user device and after generation of the IPA file, an embedded application in accordance with one or more illustrative aspects described herein.

FIG. 3 depicts an example method 300 for processing, at a user device and after generation of the IPA file described above at FIG. 2, an embedded application in accordance with one or more illustrative aspects described herein. Referring to FIG. 3, at step 305, a mobile device may request the IPA file distributed to the server at step 260. For example, the mobile device may download, from the iTunes application store, the IPA file. For example, the user may download "Company Mail" from the iTunes application store.

At step 310, the mobile device may receive the IPA file requested at step 305. For example, the mobile device may download the IPA file to the mobile device. The IPA file may comprise a container file for a loader application comprising a derived class that comprises the logic from both the loader application and a second iOS application, such as the second iOS application embedded into the first iOS application at step 220.

Figure 8:
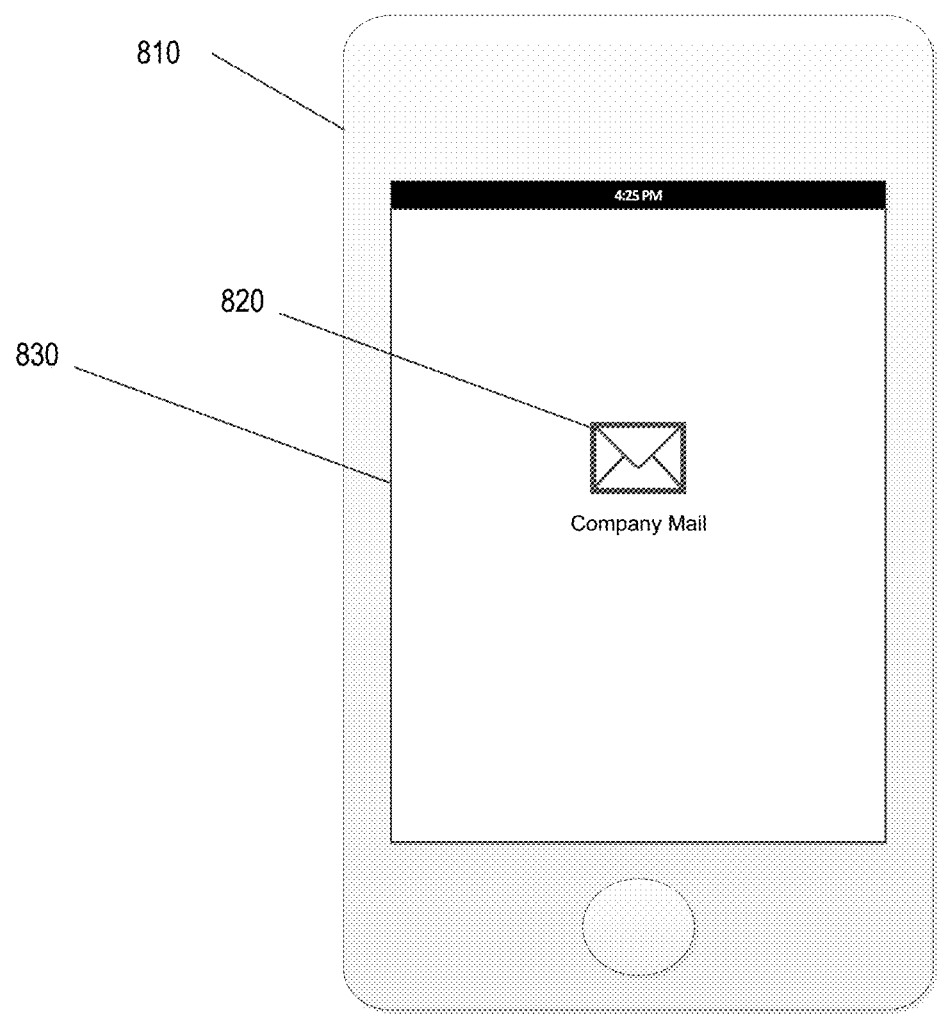
FIG. 8 depicts an example computing device implementing a loader application with an embedded secondary application in accordance with one or more illustrative aspects described herein.

At step 320, the user device may display the loader application. For example, the mobile device may use software such as iTunes, Bandizip, MoboMarket For iOS, Free File Viewer and the like to open the IPA file and access the loader application. Once the loader application is accessed, the user device may display an icon for the loader application. For example, the user device may generate a user interface comprising an icon for the loader application. The user interface may comprise, for example, the home screen on an iPhone. The user device may display the loader application along with the name of the second iOS application. For example, the loader application may appear, on the user interface, to comprise the second iOS application. In one example, the loader application may appear on the user interface as, for example, "Company Mail." An example of the user interface is depicted in FIG. 8.

At step 330, the user device may execute the loader application. For example, the user device may receive a user input, via the user interface described at step 320, requesting the second iOS application. Responsive to receiving the user input, the user device may initiate the loader application.

At step 340, the user device may implement functions of the second iOS application via the loader application. The user device may receive a request, from the user, to implement functions of the second iOS application. The request may be forwarded to the loader application, which may implement the derived class, thus allowing the loader application to perform the requested functions of the second iOS application. This may allow the user device to implement the functions of the second iOS application by calling a first instance of UIApplication associated with the loader application, and without calling an second instance of UIApplication associated with the second iOS application. This may allow the loader application to implement custom behaviors of the second iOS application, while allowing the loader application to maintain control over the first instance of UIApplication by permitting the first instance of UIApplication and the second instance of UIApplication to work as a single UIApplication. For example, the second iOS application may comprise "Company Mail," and thus the user device may generate the "Company Mail" user interface, and allow the user to execute, via the loader application, the same functions that he or she otherwise would while using the actual "Company Mail" program such as send/receive e-mail, browse an inbox, and the like.

Figure 4:
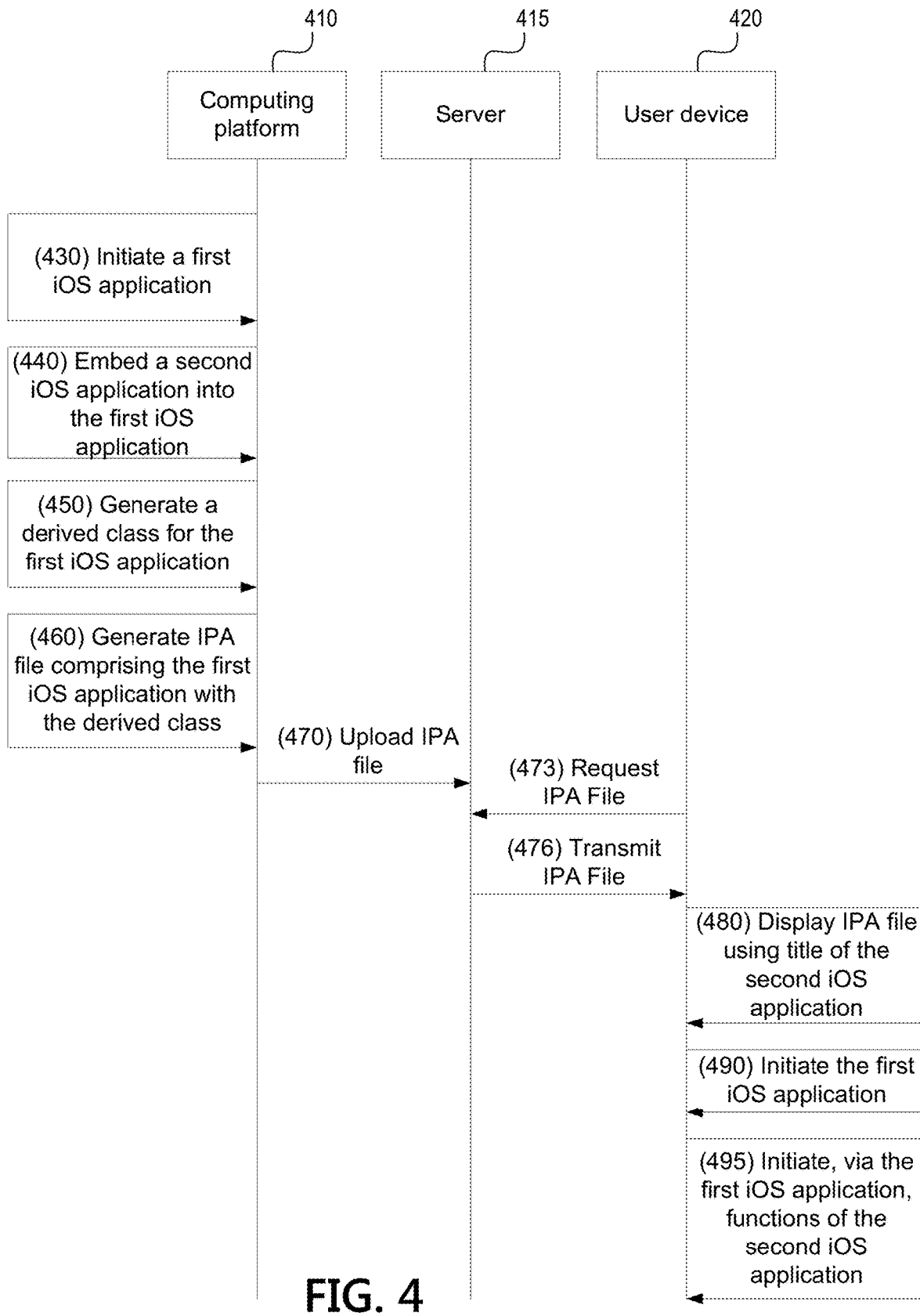
FIG. 4 depicts an example event sequence for using a loader application to embed a secondary application in accordance with one or more illustrative aspects described herein.

FIG. 4 depicts an example event sequence for using a loader application to embed a secondary application in accordance with one or more illustrative aspects described herein. For example, FIG. 4 shows the interplay between the methods 200 and 300. Referring to FIG. 4, at step 430 the computing platform 410 may initiate a first iOS application. This computing platform 410 may comprise the computing platform used to perform the method 200. The computing platform 410 may initiate the first iOS application which may comprise a loader application used to secure third party applications. The first iOS application may comprise a first instance of UIApplication that may comprise an NSObject class comprising a plurality of variables, selectors, methods, and properties. Actions performed at step 430 may be similar to those described above with regards to step 210.

At step 440, the computing platform 410 may embed, into the first iOS application, a second iOS application. The computing platform 410 may initiate the second iOS application. For example, the computing platform 410 may load, within an address space of the first iOS application, the second iOS application. The second iOS application may comprise a third party application. The second iOS application may comprise a second instance of UIApplication, and thus may comprise a class that is different than or the same as the NSObject class comprising the first instance of UIApplication. For example, the class associated with the second iOS application may comprise a first derived class, comprising a plurality of variables, selectors, methods, and properties that are different than the plurality of variables, selectors, methods, and properties comprising the NSObject class of the first iOS application. The computing platform 410 may compare the class associated with the second iOS application to the NSObject class associated with the first iOS application by inspecting, via objective inspection classes, the classes associated with the first iOS application and the second iOS application respectively. Actions performed at step 440 may be similar to those described above with regards to step 220 and 230.

At step 450, after determining that the second instance of UIApplication comprises a first derived class at step 440, the computing platform 410 may generate a second derived class for the second iOS application. The second derived class may comprise the variables, selectors, methods, and properties of both the first instance of UIApplication and the second instance of UIApplication. This may allow a device to execute methods of the second iOS application, embedded within the first iOS application, without calling the second instance of UIApplication. Actions performed at step 450 may be similar to those described above with regards to step 240.

At step 460, the computing platform 410 may generate an IPA file comprising the second iOS application, embedded within the first iOS application. The IPA file may comprise the second derived class. Actions performed at step 460 may be similar to those described above with regards to step 250.

At step 470, the computing platform may distribute the IPA file, generated at step 460, to a server 415. Actions performed at step 470 may be similar to those described above with regards to step 260.

At step 473, the server 415 may receive, from the user device 420, a request for the IPA file, uploaded at step 470. For example, a user may request, via a user interface comprising the user device 420, the IPA file. As an example, the user may navigate, on the user device 420, to the Application Store in iTunes, and may select the IPA file for download. Actions performed at step 473 may be similar to those described above with regards to step 305.

At step 476, the server 415 may transmit, to the user device 420 and responsive to receiving the request, the IPA file. Actions performed at step 476 may be similar to those described above with regards to step 310.

At step 480, the user device 420 may receive, from the server 415 and via the transmission described at step 476, the IPA file. The IPA file may comprise a loader application comprising the second derived class. As such, the user device 420 may be capable of implementing functions of the second iOS application via the loader application. The user device 420 may display the first iOS application comprising the IPA file on a user interface comprising the user device 420. The user interface may comprise an icon representative of the second iOS application along with the name of the second iOS application. For example, if the second iOS application comprises "Company Mail," the icon for the first iOS application may comprise an email icon and the text "Company Mail," below the icon. This user interface is depicted in FIG. 8. Actions performed at step 480 may be similar to those described above with regards to step 310.

At step 490, the user device 420 may initiate the first iOS application comprising the IPA file. For example, as described at 480, the first iOS application may comprise a loader application. The user device 420 may initiate the first iOS application in response to receiving a user input via the user interface. For example, a user may touch the "Company Mail" icon, indicating an intention to open the second iOS application. Actions performed at step 490 may be similar to those described above with regards to step 330.

At step 495, the user device 420 may implement the functions of the second iOS application. For example, the second iOS application may comprise "Company Mail" and the user device 420 may perform the functions of "Company Mail," such as send/receive email, browse messages, and the like. Actions performed at step 495 may be similar to those described above with regards to step 340.

Enterprise Mobility Management Architecture

Figure 5:
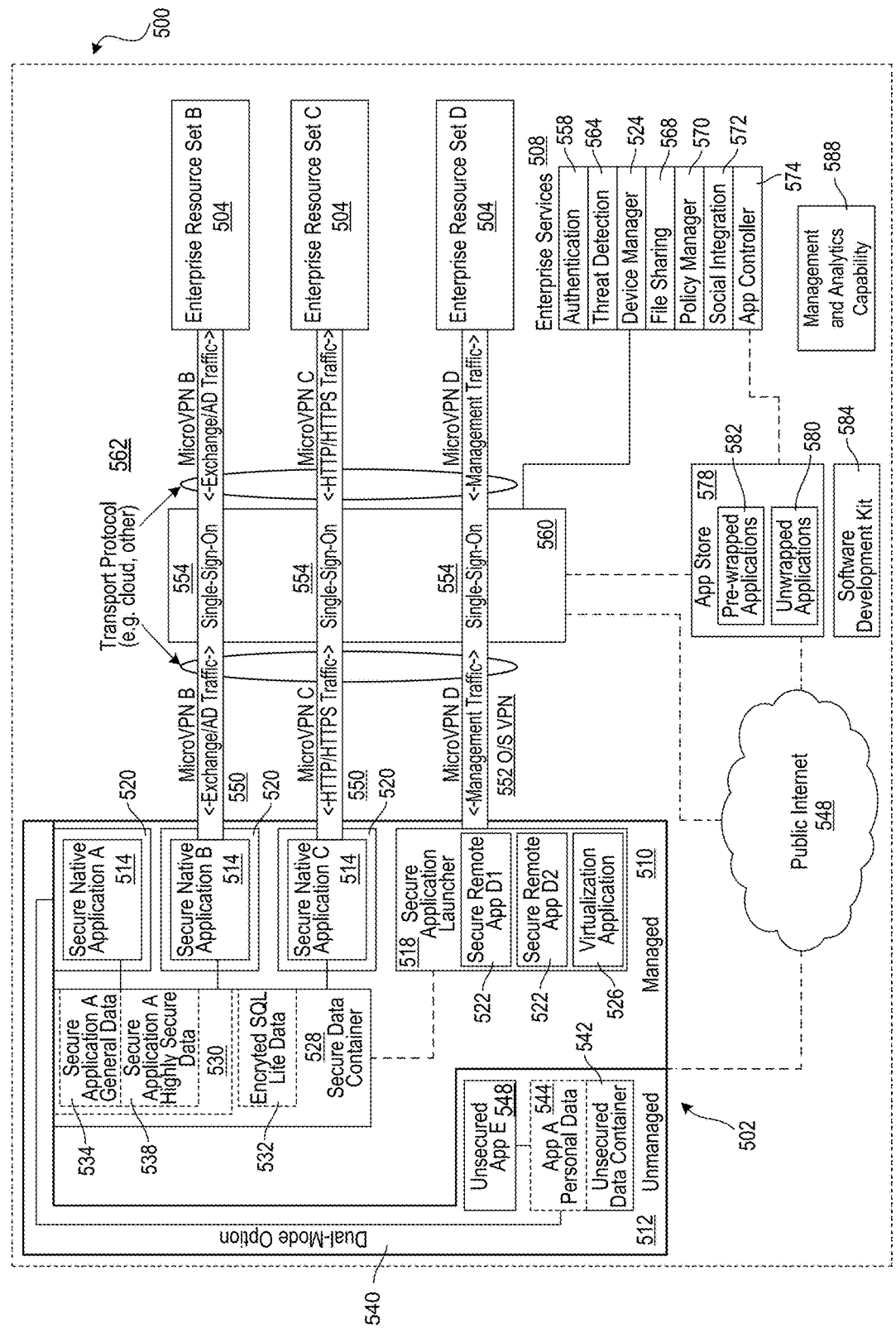
FIG. 5 depicts an illustrative enterprise mobility management system in accordance with one or more illustrative aspects described herein.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
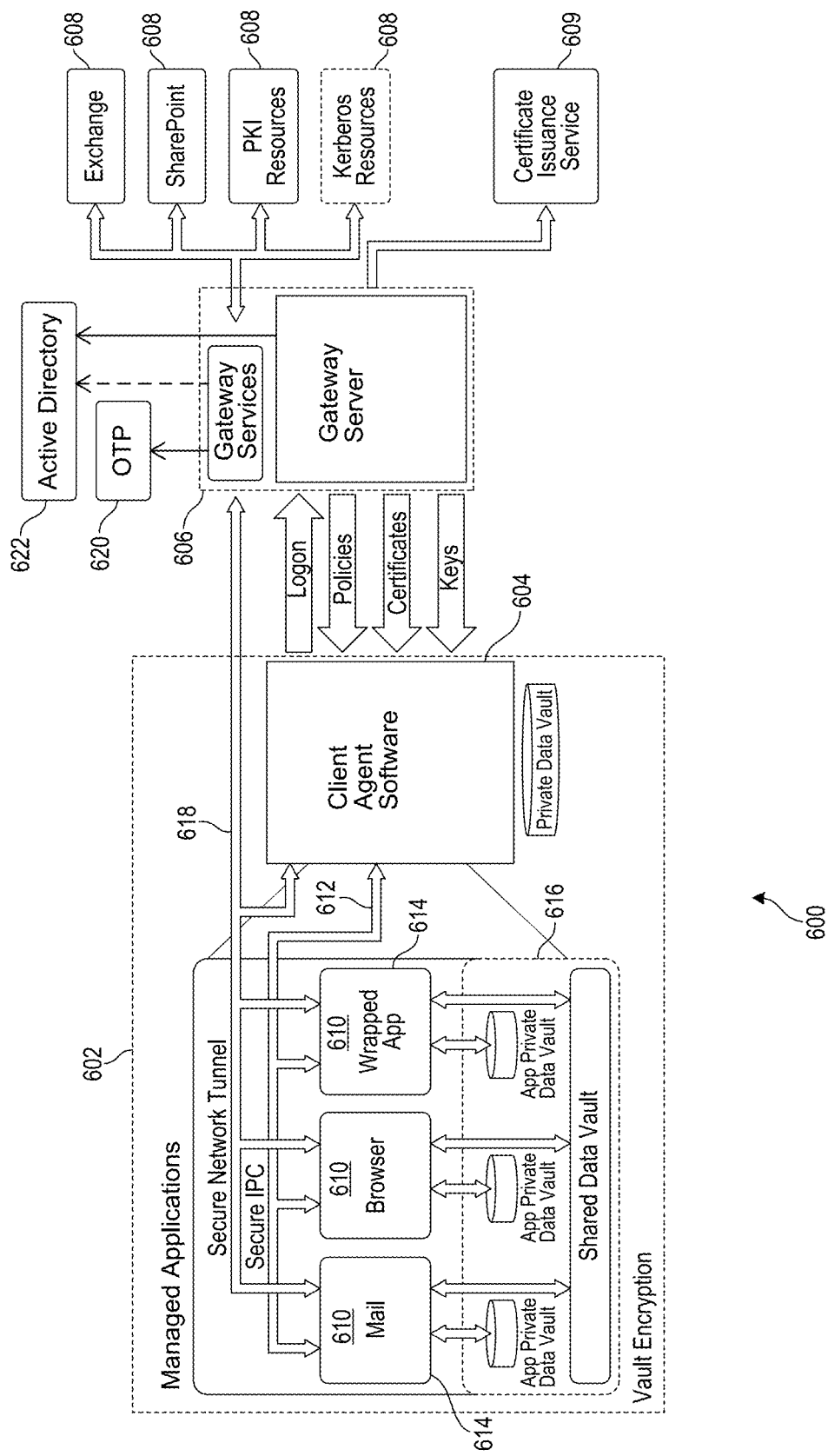
FIG. 6 depicts another illustrative enterprise mobility management system in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Loader Application with Secondary Embedded Application Object

Figure 7:
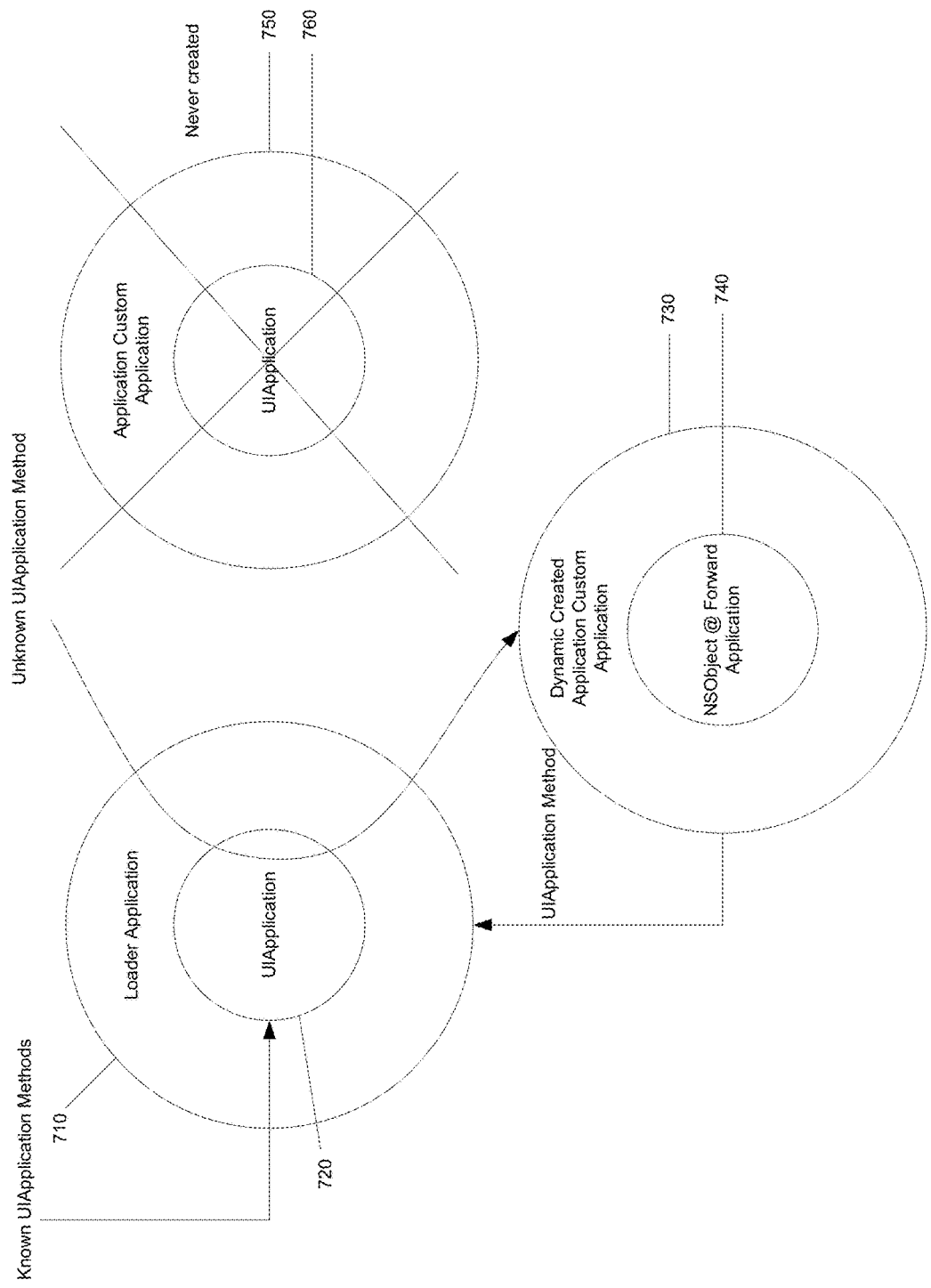
FIG. 7 depicts an example loader application with a secondary embedded application object in accordance with one or more illustrative aspects described herein.

FIG. 7 depicts an example loader application with a secondary embedded application object in accordance with one or more illustrative aspects described herein. Referring to FIG. 7, a first iOS application may comprise a loader application 710. This loader application 710 may comprise, for example, the first iOS application described above with regards to step 310. The loader application 710 may comprise a first instance of UIApplication 720. The first instance of UIApplication 720 may comprise a plurality of known UIApplication methods. A second iOS application may comprise a custom iOS application 750. The custom iOS application 750 may comprise, for example, the second iOS application described at step 220. The custom iOS application 750 may comprise a second instance of UIApplication 760. The second instance of UIApplication 760 may comprise unknown UIApplication methods.

Embedding the custom iOS application 750 into the loader application 710 may cause problems because both the custom iOS application 750 and the loader application 710 may both call their respective instances of UIApplication. This may cause the loader application 710 and the custom iOS application 750 to fail. To remedy the problem, a computing platform, such as the computing platform 410, may dynamically generate a new version 730 of the custom iOS application 750 to embed into the loader application 710. The new version 730 may comprise a class 740 comprising NSObject and a derived class. Thus the derived class may comprise the methods, properties, variables, and selectors of both NSObject and the second instance of UIApplication 760. The computing platform may determine the methods, properties, variables, and selectors of the second instance of UIApplication 760 by inspecting, at runtime and via objectiveC inspection classes, the second instance of UIApplication 760.

The class 740 may forward requests for the second instance of UIApplication 760 to the loader application 710. By registering the class 740 as a forwarding object for unknown selectors, methods defined by the second instance of UIApplication 760 may execute without initiating the second instance of UIApplication 760. For example, the computing platform may embed the new version 730 into the loader application 710, thus allowing the loader application 710 to perform the methods of the custom iOS application 750, without calling the second instance of UIApplication 760. Further, this may allow for the first instance of UIApplication 720 and the second instance of UIApplication 760 to work as a single UIApplication while allowing for custom behaviors to exist of the custom iOS application 750. Additionally, this allows for the loader application 710 to maintain control over the first instance of UIApplication 720.

After the computing platform embeds the new version 730 into the loader application 710, the computing platform may transmit, to a server such as the server 415, the loader application 710. This may comprise, for example, the transmission described at step 470.

FIG. 8 depicts an example computing device implementing a loader application with an embedded secondary application in accordance with one or more illustrative aspects described herein. Referring to FIG. 8, a computing device 810, such as the user device 420, may generate a user interface 830. For example, the computing device 810 may implement the method 400, as described above. The computing device 810 may be configured to run a version of iOS. The user interface 830 may comprise, for example, the home screen of a user's cell phone, and may comprise a plurality of icons. Each of the plurality of icons may initiate an iOS application in response to receiving, via the user interface 830, a user input. For example, a user may touch the icon. Using the methods described herein, the computing device 810 may generate an icon 820 for the loader application. The icon 820 may comprise an image associated with the embedded secondary application and the name of the embedded secondary application. For example, the embedded secondary application may comprise "Company Mail." In this example, the icon 820 for the loader application may resemble an icon for "Company Mail." In response to receiving an input, via the user interface, corresponding to "Company Mail," the user's cell phone may launch the loader application and execute the methods of "Company Mail."

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
initiating, at a computing platform comprising at least one processor, memory, and a communication interface, by the at least one processor, a first iOS application comprising a first name and a first instance of UIApplication comprising an NSObject class, wherein the UIApplication provides a central control for multiple iOS applications;
embedding, into the first iOS application, by the at least one processor, a second iOS application comprising a second name, a second instance of the UIApplication, and a first derived class, wherein:
the first derived class is derived based on the NSObject class, and
each of the first iOS application and the second iOS application contains a single instance of the UIApplication;
generating, by the at least one processor, based on the NSObject class and the first derived class, a second derived class;
generating, by the at least one processor, an iPhone Application (IPA) file comprising the first iOS application wherein the first iOS application comprises the second derived class and the second name of the embedded second iOS application; and
transmitting, to a plurality of mobile devices, by the at least one processor and via the communication interface, the IPA file.

2. The method of claim 1, further comprising inspecting, by the at least one processor and via one or more objectiveC inspection classes, the first derived class, wherein the first derived class comprises at least one of: a variable of the second iOS application, a selector of the second iOS application, a method of the second iOS application, and a property of the second iOS application.

3. The method of claim 2, wherein the inspecting the first derived class occurs at runtime.

4. The method of claim 1, further comprising loading, by the at least one processor and within an address space of the first iOS application, the second iOS application, wherein the loading comprises loading, prior to the embedding, the second iOS application.

5. The method of claim 1, wherein the first iOS application comprises a loader application and wherein the second iOS application comprises a third party application.

6. A computing platform comprising:
at least one processor;
a communication interface communicatively coupled to the at least one processor; and
memory storing computer-readable instructions that, when executed by the at least one processor, cause the computing platform to:
initiate, by the at least one processor, a first iOS application comprising a first name and a first instance of UIApplication comprising an NSObject class, wherein the UIApplication provides a central control for multiple iOS applications;
embed, into the first iOS application, by the at least one processor, a second iOS application comprising a second name, a second instance of the UIApplication, and a first derived class, wherein:
the first derived class is derived based on the NSObject class, and
each of the first iOS application and the second iOS application contains a single instance of the UIApplication;
generate, by the at least one processor, based on the NSObject class and the first derived class, a second derived class;
generate, by the at least one processor, an iPhone Application (IPA) file comprising the first iOS application wherein the first iOS application comprises the second derived class and the second name of the embedded second iOS application; and
transmit, to a plurality of mobile devices, by the at least one processor and via the communication interface, the IPA file.

7. The computing platform of claim 6, wherein the memory stores additional computer-readable instructions, that when executed by the at least one processor, cause the computing platform to:
inspect, by the at least one processor and via one or more objectiveC inspection classes, the first derived class, wherein the first derived class comprises at least one of: a variable of the second iOS application, a selector of the second iOS application, a method of the second iOS application, and a property of the second iOS application.

8. The computing platform of claim 7, wherein the inspecting the first derived class occurs at runtime.

9. The computing platform of claim 6, wherein the memory stores additional computer-readable instructions, that when executed by the at least one processor, cause the computing platform to:
load, by the at least one processor and within an address space of the first iOS application, the second iOS application, wherein the loading comprises loading, prior to the embedding, the second iOS application.

10. The computing platform of claim 6, wherein the first iOS application comprises a loader application and wherein the second iOS application comprises a third party application.

11. A method comprising:
initiating, at a computing platform comprising at least one processor, memory, and a communication interface, by the at least one processor, a first iOS application comprising a first name and a first instance of UIApplication comprising an NSObject class;
embedding, into the first iOS application, by the at least one processor, a second iOS application comprising a second name, a second instance of the UIApplication, and a first derived class, wherein the first derived class is derived based on the NSObject class;
generating, by the at least one processor, based on the NSObject class and the first derived class, a second derived class;
registering the second derived class as a forwarding object for unknown selectors;
generating, by the at least one processor, an iPhone Application (IPA) file comprising the first iOS application wherein the first iOS application comprises the second derived class and the second name of the embedded second iOS application; and
transmitting, to a plurality of mobile devices, by the at least one processor and via the communication interface, the IPA file.

12. The method of claim 11, further comprising inspecting, by the at least one processor and via one or more objectiveC inspection classes, the first derived class, wherein the first derived class comprises at least one of: a variable of the second iOS application, a selector of the second iOS application, a method of the second iOS application, and a property of the second iOS application.

13. The method of claim 12, wherein the inspecting the first derived class occurs at runtime.

14. The method of claim 11, further comprising loading, by the at least one processor and within an address space of the first iOS application, the second iOS application, wherein the loading comprises loading, prior to the embedding, the second iOS application.

15. The method of claim 11, wherein the first iOS application comprises a loader application and wherein the second iOS application comprises a third party application.

16. A computing platform comprising:
at least one processor;
a communication interface communicatively coupled to the at least one processor; and
memory storing computer-readable instructions that, when executed by the at least one processor, cause the computing platform to:
initiate, by the at least one processor, a first iOS application comprising a first name and a first instance of UIApplication comprising an NSObject class;
embed, into the first iOS application, by the at least one processor, a second iOS application comprising a second name, a second instance of the UIApplication, and a first derived class, wherein the first derived class is derived based on the NSObject class;
generate, by the at least one processor, based on the NSObject class and the first derived class, a second derived class;
register the second derived class as a forwarding object for unknown selectors;
generate, by the at least one processor, an iPhone Application (IPA) file comprising the first iOS application wherein the first iOS application comprises the second derived class and the second name of the embedded second iOS application; and
transmit, to a plurality of mobile devices, by the at least one processor and via the communication interface, the IPA file.

17. The computing platform of claim 16, wherein the memory stores additional computer-readable instructions, that when executed by the at least one processor, cause the computing platform to:
inspect, by the at least one processor and via one or more objectiveC inspection classes, the first derived class, wherein the first derived class comprises at least one of: a variable of the second iOS application, a selector of the second iOS application, a method of the second iOS application, and a property of the second iOS application.

18. The computing platform of claim 17, wherein the inspecting the first derived class occurs at runtime.

19. The computing platform of claim 16, wherein the memory stores additional computer-readable instructions, that when executed by the at least one processor, cause the computing platform to:
load, by the at least one processor and within an address space of the first iOS application, the second iOS application, wherein the loading comprises loading, prior to the embedding, the second iOS application.

20. The computing platform of claim 16, wherein the first iOS application comprises a loader application and wherein the second iOS application comprises a third party application.

* * * * *